United States Patent [19]
Penson

[11] Patent Number: 4,602,742
[45] Date of Patent: Jul. 29, 1986

[54] MOBILE SPRAYING UNIT WITH SELECTABLE SPRAY POSITION

[76] Inventor: Joe R. Penson, Rte. 4, Box 754, Louisville, Tenn. 37777

[21] Appl. No.: 658,582

[22] Filed: Oct. 9, 1984

[51] Int. Cl.[4] ............................................. A01G 25/09
[52] U.S. Cl. ..................... 239/172; 239/176; 239/587
[58] Field of Search ........ 239/159, 170, 142, 456–458, 239/587, 172, 169, 175, 176; 406/153

[56] References Cited

U.S. PATENT DOCUMENTS

| | | | |
|---|---|---|---|
| 3,153,509 | 10/1964 | Curtis | 239/172 |
| 3,166,252 | 1/1965 | O'Brien et al. | 239/587 |
| 3,784,100 | 1/1974 | Kirschmann | 239/172 X |
| 4,089,446 | 5/1978 | Logan, II et al. | 239/172 X |
| 4,252,274 | 2/1981 | Kubacak | 239/176 X |
| 4,311,274 | 1/1982 | Neal | 239/172 X |
| 4,505,623 | 3/1985 | Mulder | 406/153 X |

*Primary Examiner*—Jeffrey V. Nase
*Assistant Examiner*—L. E. Williams
*Attorney, Agent, or Firm*—Pitts and Brittian

[57] ABSTRACT

An improved spraying device (10) is disclosed for dispersing a liquid over a preselected surface. The device (10) comprises a frame (13) provided with a pair of rotatably mounted wheel members (19) and a connector for releasably engaging a drawing vehicle. A supply tank (12) is mounted on the frame (13) for holding the liquid to be dispersed, and a pump (50) is provided for pumping the liquid from the supply tank (12) to liquid dispersing units. The liquid dispersing units comprises at least one sprayer bar (28) mounted on the frame (13) and, in one embodiment, a hand held sprayer (83). Further, in one preferred embodiment, the device (10) is provided with agitator an for mixing the contents of the supply tank (12).

11 Claims, 9 Drawing Figures

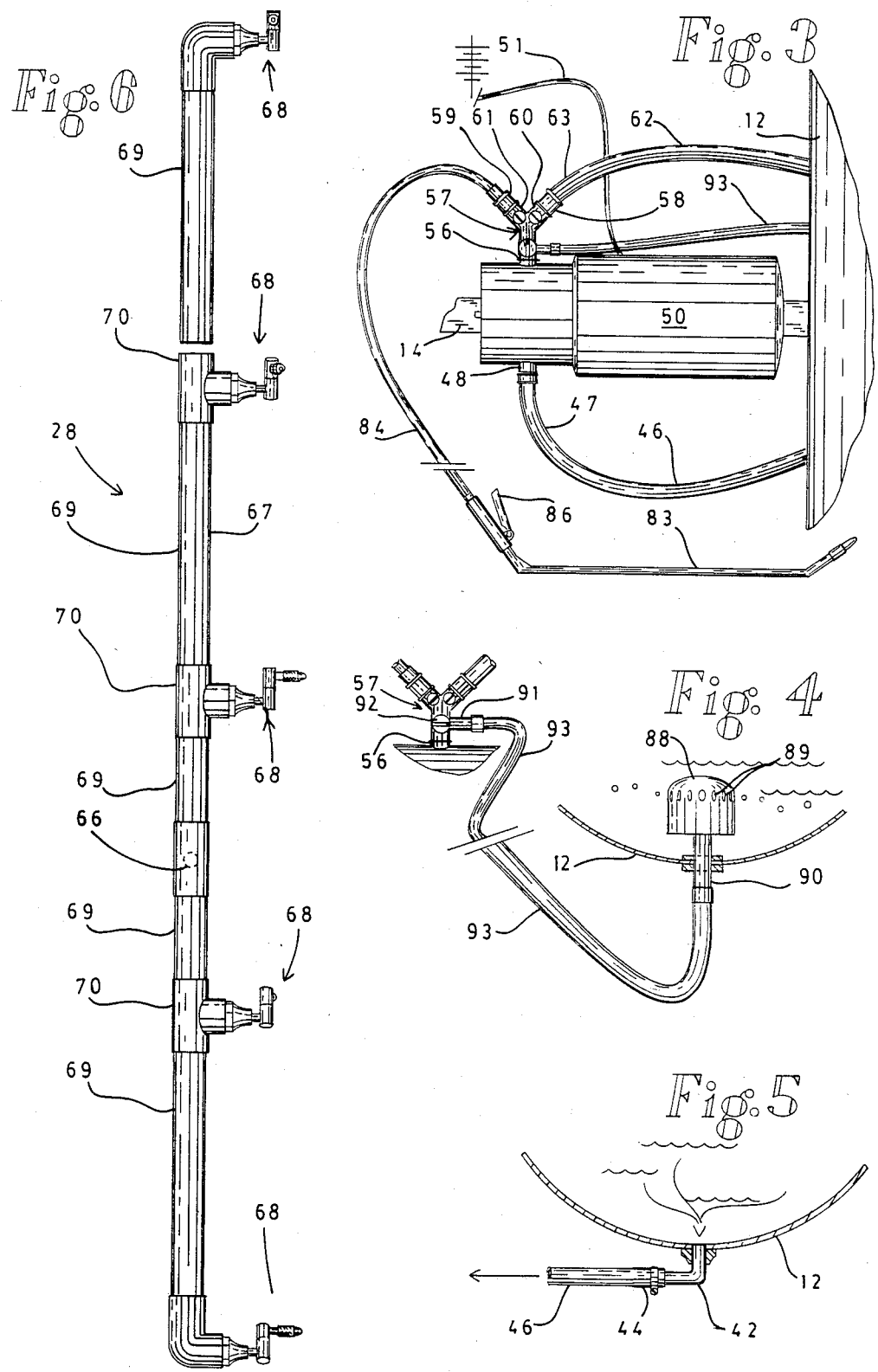

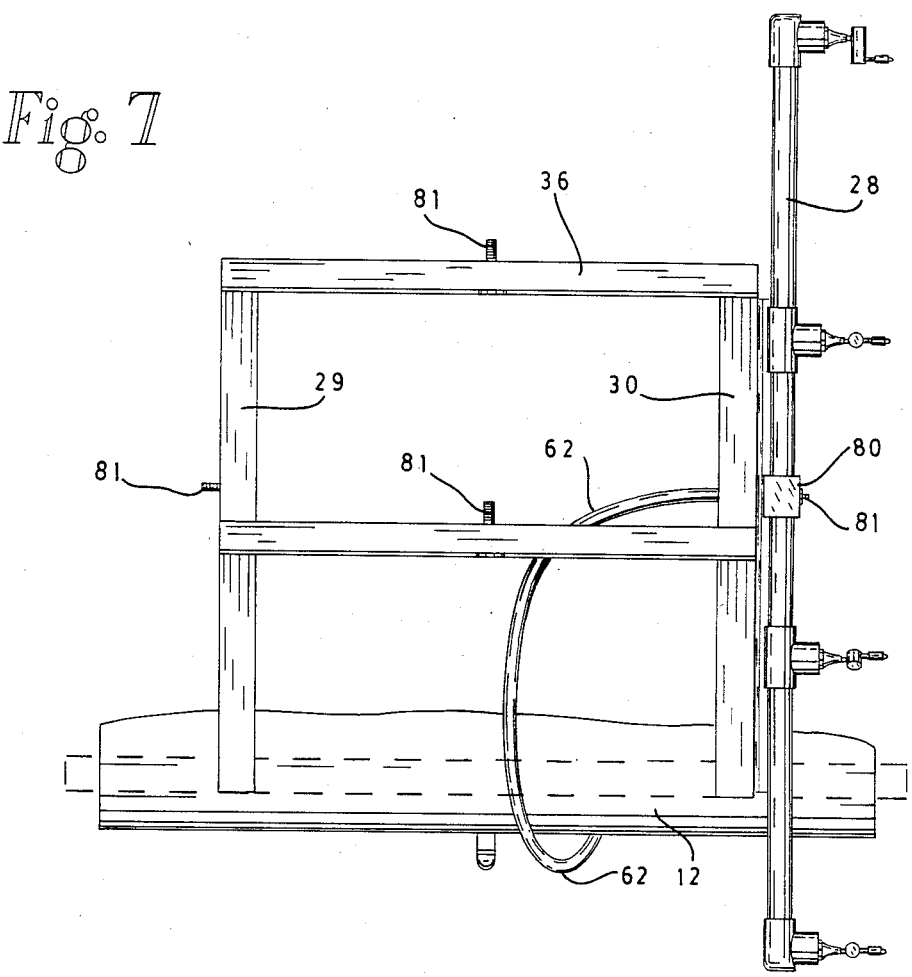
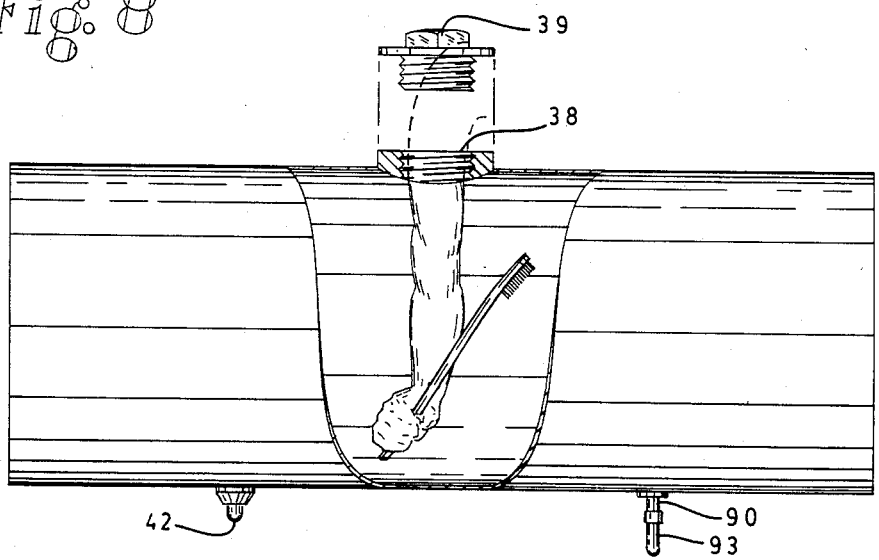

MOBILE SPRAYING UNIT WITH SELECTABLE SPRAY POSITION

TECHNICAL FIELD

This invention relates to an improved spraying device for being pulled or drawn by a riding lawn mower, tractor or other suitable drawing vehicle for dispersing a liquid, such as fertilizer or insecticide, over a preselected surface.

BACKGROUND ART

Spraying devices for spraying liquid chemicals, such as fertilizer or insecticides, on crops have long been in use in commercial farming operations. However, such devices are generally mechanically complex, and thus expensive, and require a powerful towing vehicle. Thus, most commercial spraying devices are not suitable for use by the average home owner who desires the convenience of a mobile spraying device to spray his lawn or garden with insecticide or disperse other liquids. Various attempts have been made to provide portable spraying devices, such as the devices described in U.S. Pat. Nos. 3,575,348; 3,412,938; 4,236,673; and 4,296,875. However, with the possible exception of U.S. Pat. No. 4,296,875, such devices are not well adapted to lawn and garden use or for being drawn by a lawn mower or lawn tractor. With regard to U.S. Pat. No. 4,296,875, the device disclosed is a foam dispenser limited in the manner in which the foam can be dispensed and must be in motion for the pump to operate. U.S. Pat. No. 3,921,907 also discloses a mobile spraying device, but this device utilizes a pressurized tank necessitating a complicated spray control mechanism and the dispersing means are relatively limited.

Accordingly, it is an object of the present invention to provide an improved spraying device for being towed or drawn by a riding lawn mower, lawn tractor or other suitable drawing vehicle, for spraying a liquid on a preselected surface.

Another object of the present invention is to provide an improved spraying device with dispersing means which allows the operator to spray a large area with one pass of the device, and which allows the operator to selectively direct the spray as desired.

Yet another object of the invention is to provide an improved spraying device which is provided with agitation means for mixing the contents of the supply tank of the device.

A further object of the present invention is to provide an improved spraying device which is inexpensive to manufacture and maintain.

DISCLOSURE OF THE INVENTION

Other objects and advantages will be accomplished by the present invention which provides an improved spraying device for being pulled or drawn by a riding lawn mower, tractor or other suitable drawing vehicle for dispersing a liquid, such as fertilizer or insecticide, over a preselected surface. The device comprises a frame provided with a pair of rotatably mounted wheel members and means for releasably engaging the drawing vehicle. A supply tank is mounted on the frame, the supply tank serving as a reservoir for holding the liquid to be dispersed. The device also comprises a pump mounted on the frame for pumping the liquid from the supply tank to liquid dispersing means. The liquid dispersing means includes at least one sprayer bar carrying a plurality of spray nozzles, the sprayer bar being provided with means for establishing fluid communication between the sprayer bar and the outlet port of the pump. In one embodiment, the device also comprises a hand held sprayer for selectively dispersing the liquid and agitator means for mixing the contents of the supply tank.

BRIEF DESCRIPTION OF THE DRAWINGS

The above mentioned features of the invention will become more clearly understood from the following detailed description of the invention read together with the drawings in which:

FIG. 3 is a top view of the pump and Y-valve of the improved spraying device of the present invention.

FIG. 4 is a side elevation view of the agitator means of the improved spraying device of the present invention.

FIG. 5 is a side elevation view, partially in section, of a portion of the supply tank of the improved spraying device of the present invention.

FIG. 6 is a top view of a sprayer bar of the present invention.

FIG. 7 is a rear view of the sprayer bar support assembly of the present invention.

FIG. 8 is a front view, partially in section, of the supply tank of the present invention.

BEST MODE FOR CARRYING OUT THE INVENTION

Figure 1:
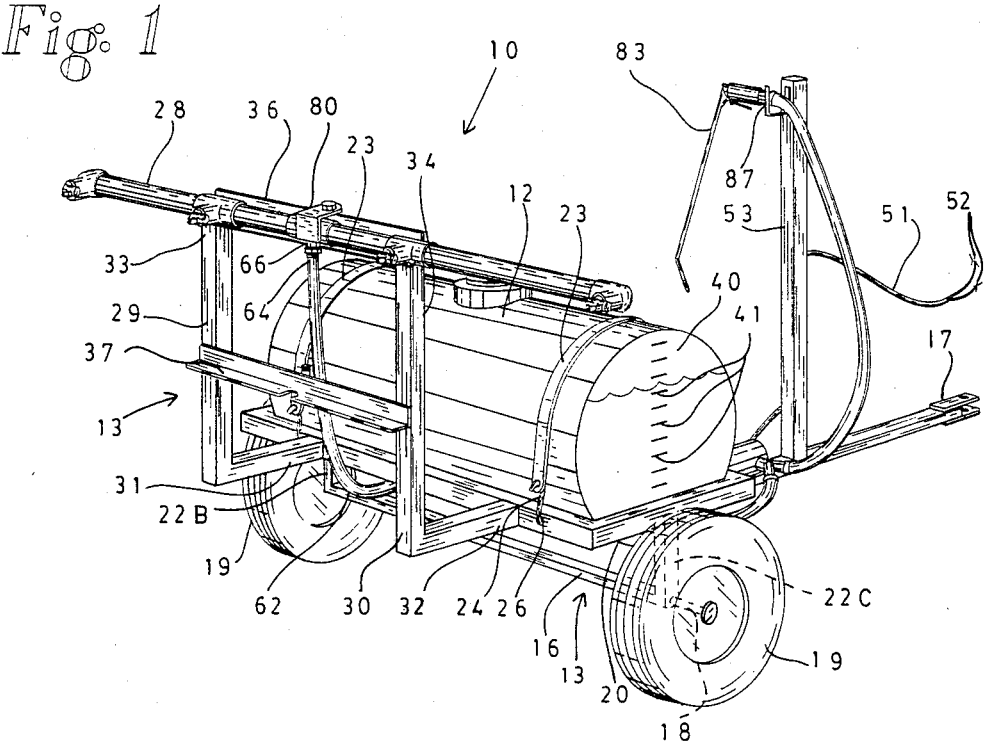
FIG. 1 is a perspective view of the improved spraying device of the present invention.

An improved spraying device incorporating various features of the present invention is illustrated generally at 10 in FIG. 1. The device 10 is designed to be drawn behind a standard riding lawn mower, a small tractor or other motor vehicle. Whereas it is designed primarily for dispersing such substances as liquid fertilizer, weed killer and insecticides on a lawn or garden, it will be appreciated that the spraying device 10 can be used to selectively disperse various liquids over various preselected surfaces.

The improved spraying device 10 generally comprises a liquid supply tank 12, a pump 50, and liquid dispersing means mounted on a mobile frame 13. More specifically, the frame 13 comprises a substantially T-shaped under carriage including a forward support member 14 secured to, and extending perpendicularly from, an axle support member 16. The outboard end portion of the support member 14 is provided with a clevis 17 for releasably and pivotally engaging a hitch or other connecting device on the rear of a mower, tractor or other motor vehicle (not shown). Of course, it will be understood that the clevis 17 is merely illustrative of one means for securing the device 10 to the drawing vehicle and various other means can be used such as a socket for receiving a conventional ball-type trailer hitch.

The frame 13 is provided with an axle 18 which is journalled through and, thus, supported by the axle support member 16. It will be appreciated that in the preferred embodiment of the device 10, the axle support member 16 carries bearings (not shown) proximate its opposite ends through which the axle 18 is journalled to facilitate the friction free rotation of the axle 18. Wheel members 19 are mounted at the opposite ends of the axle 18 such that the wheel members 19 rotate with respect to the frame 13, thus facilitating the mobility of the frame 13 and the device 10.

Figure 2:
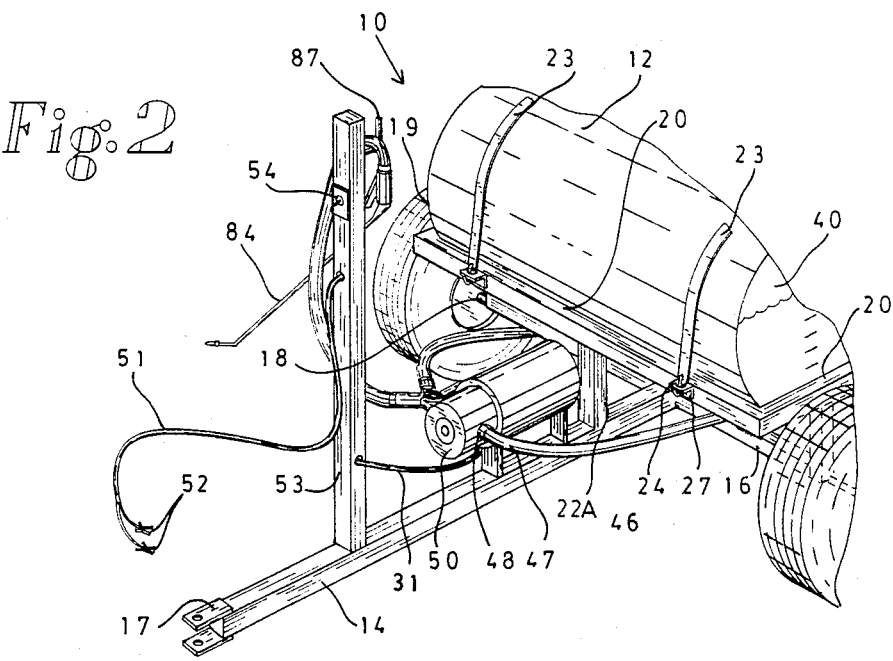
FIG. 2 is a perspective view of the forward portion of the improved spraying device of the present invention.

The frame 13 further comprising a substantially rectangular tank support 20 which is supported on the under carriage of the frame 13 with the brace members 22A, 22B, and 22C, the brace member 22A being secured to the support member 14 and the brace members 22B and 22C being secured to the axle support member 16 proximate the opposite ends of the member 16. As illustrated, the tank support 20 defines a rectangular opening closely receptive of the lower portion of the supply tank 12, and the tank 12 is secured in place with one or more securing straps 23. In this regard, the securing straps 23 are provided at their opposite ends with hook members 24 for being releasably secured in the holes 26 in the tank support 20 (see FIG. 1) or alternatively, for engaging the flanges 27 of the tank support 20 (see FIG. 2). Of course, various other securing means could be used to secure the tank 12 on the tank support 20 and the securing straps 23 are simply illustrative of one such means. Further, only one strap 23 can be used.

Continuing with regard to the frame 13, a sprayer bar support assembly is provided for releasably supporting one or more sprayer bars 28, the sprayer bars 28 being discussed in detail below. The sprayer bar support assembly comprises a pair of L-shaped assembly support members 29 and 30 having lower end portions 31 and 32, respectively, secured to the tank support 20 and upper end portions 33 and 34, respectively, secured to, and supportive of, a horizontally disposed primary bar support 36. Further, a secondary bar support 37 is secured to the L-shaped assembly support members 29 and 30 below the primary bar support 36. It should be noted at this point that the various components of the frame 13 are preferably fabricated of steel or other durable metal, and are secured together by welding or through the use of other suitable securing means.

It will be understood that the supply tank 12 provides a reservoir for holding the fertilizer, insecticide or other liquid which is to be dispersed. Accordingly, the tank 12 is provided with an access aperture 38 through which the tank 12 can be filled, a cap 39 being provided for being threadably received in the aperture 38 for selectively closing the aperture 38. It will be noted that in the preferred embodiment of the device 10, as illustrated in FIG. 8, the aperture 38 defines a large enough diameter to allow the insertion of one's arm to facilitate the cleaning of the interior walls of the tank 12. Further, in the preferred embodiment, the tank 12 is fabricated of a strong durable plastic so as to be light weight and is provided with at least one transparent, or translucent, end wall 40 provided with suitable level measuring indicia 41 to allow the user to visually determine the amount of liquid in the tank 12 at any given time.

As is best illustrated in FIG. 5, the tank 12 is also provided with a conduit 42 mounted at the bottom of the tank 12 and communicating with the interior of the tank 12. The conduit 42 comprises an outboard end portion 43 for releasably receiving the first end portion 44 of a primary supply hose 46, the second end portion 47 of the hose 46 being releasably received by the input port 48 of the pump 50 (see FIG. 3), thus, establishing fluid communication between the tank 12 and the pump 50.

The pump 50 is mounted on the forward support member 14 of the frame 13. The pump 50 preferably comprises a 12 volt electrical pump capable of being powered by the electrical system of the mower or other motor vehicle which is used to pull the spraying device 10, or capable of being independently powered by a 12 volt battery. Accordingly, the pump 50 is provided with circuitry means for connecting the pump to the desired power source. In one preferred embodiment such circuitry means comprises the electric cables 51, the cables 51 being provided with alligator clips 52 or other suitable connectors on their outboard ends for engaging the desired power source. Further, in the preferred embodiment of the device 10, the forward support member 14 carries an upwardly extending utility support member 53 and the cables 51 are routed through an on/off switch 54 mounted on the utility support member 53. Thus, the pump 50 can be selectively turned on and off with the switch 54 without disconnecting the cables 51 from the power source. It will be appreciated that the utility support member 53 is mounted far enough forward on the forward support member 14 to allow the operator of the drawing vehicle to reach and manipulate the switch 54 without dismounting from the vehicle.

The pump 50 is also provided with an outlet port 56 on which is mounted a Y-valve 57 for selectively directing the flow of liquid pumped from the tank 12 by the pump 50. The Y-valve 57 defines two exit ports 58 and 59 to which fluid communication can be selectively adjusted or closed by rotating the valve manipulators 60 and 61, respectively. A first distribution hose 62, having first and second end portions 63 and 64 is provided for establishing fluid communication between the pump 50 and the sprayer bar 28. In this regard, the first end portion 63 of the hose 62 is secured to the exit port 58 of the Y-valve 57 and the second end portion 64 of the hose 62 is secured to inlet port 66 of the spray bar 28. In the preferred embodiment, the inlet port 66 threadably receives the second end portion 64 of the hose 62 such that the hose 62 can be easily removed to facilitate removal and/or replacement of the spray bar 28. However, it will be appreciated that various coupling means can be used to secure the hose 62 to the inlet 66.

As illustrated, the sprayer bar 28 comprises an elongated tube 67 provided with a plurality of selectively spaced dispersing nozzles 68 communicating with the interior of the tube 67. Thus, it will be appreciated that during operation liquid pumped from the tank 12 by the pump 50 is pumped out of the outlet port 56 of the pump 50 through the Y-valve 57 and hose 62 into the tube 67 via the inlet port 66, and dispersed through the nozzles 68. It will also be appreciated that the length of the spray bar 28 and the number of nozzles 68 may vary as desired. In this regard, in the preferred embodiment of FIG. 6, the sprayer bar 28 comprises a plurality of pipe sections 69 joined with junction members 70, with each of the members 70 supporting a nozzle 68. Thus, by varying the number of pipe sections 69 and junction members 70, the desired sprayer bar length and number of nozzles 68 can be achieved.

Figure 9:
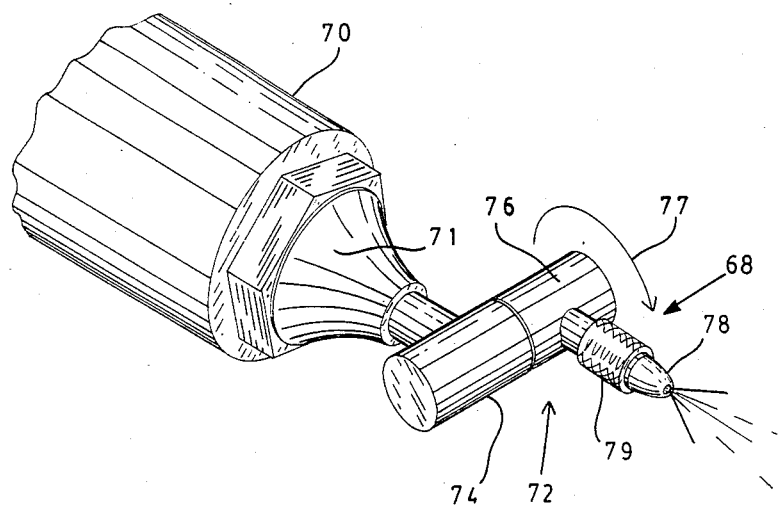
FIG. 9 is a perspective view of a dispersing nozzle of the present invention.

In the preferred embodiment of the device 10, as illustrated in FIG. 9, each of the nozzles 68 comprises a base member 71 and a nozzle body 72 rotatably mounted in the base member 71. Further, the body 72 comprises a first member 74 and a second member 76, the second member 76 being rotatable with respect to the first member 74 as illustrated by the arrow 77. The second member 76 carries nozzle end 78 from which the liquid is dispensed, the nozzle end 78 carrying a conventional threaded knurled sleeve 79 for adjusting the broadness of the spray dispersed from the nozzle 68. Thus, the nozzles 68 with their dual pivot construction allow the operator to selectively alter the direction of spray from each nozzle as desired and configure the spray width to achieve a desired field of coverage by manipulating the knurled sleeve 79.

As mentioned above, the frame 13 comprises the primary bar support 36 and the secondary bar support 37. Accordingly, a sprayer bar 28 can be mounted on either or both of the bar supports 36 and 37 as desired, a clamp member 80 being provided for releasably securing the sprayer bars 28 on the bar supports 36 and 37. Further, as illustrated in FIG. 7, the L-shaped assembly support members 29 and 30 can be provided with clamp members 80 for attachment to fasteners 81 such that a sprayer bar 28 can be mounted vertically on a member 29 or 30. Thus, with this sprayer bar arrangement, the device 10 can be drawn between rows of growing plants and used to spray the adjacent plant rows.

In addition to the sprayer bars 28, the device 10 is provided with a hand held sprayer 83. A sprayer supply hose 84 is provided for establishing fluid communication between the sprayer 83 and the exit port 59 of the Y-valve 57 such that the pump 50 serves to selectively pump liquid to the sprayer 83. The sprayer 83 is provided with a trigger member 86 for selectively dispersing liquid from the hand held sprayer 83. Further, a bracket 87 is provided on the utility support member 53 for supporting the sprayer 83 within the reach of the operator of the drawing vehicle while the sprayer 83 is not in use. Accordingly, it will be appreciated that the sprayer 83 allows the operator to spray selected localities which are not reached by spray from the sprayer bars 28 without dismounting from the drawing vehicle.

As illustrated in FIG. 4, in one preferred embodiment of the spraying device 10, agitator means are provided for agitating or mixing the contents of the supply tank 12. The agitator means comprises an agitator nozzle 88 mounted within the supply tank 12 proximate the bottom of the tank 12. The agitator nozzle 88 carries a plurality of selectively spaced holes 89 which communicate with a conduit 90 which extends exterior to the supply tank 12. The Y-valve 57 is provided with an auxiliary conduit 91 which may be selectively closed by rotating the manipulator 92, the conduit 91 serving to divert fluid pumped under pressure by the pump 50 into a hose 93. As illustrated, the hose 93 engages and communicates with the conduit 90 of the agitator nozzle 88 such that when the auxiliary conduit 91 is open, fluid is pumped by the pump 50 into the tank 12, under pressure, through the agitator nozzle 88. This injection of fluid causes agitation in the liquid in the tank 12 which serves to keep the powder (such as a pesticide) mixed with the liquid. This agitator is particularly useful where the substance to be dispersed by the device 10 comprises solid particulates suspended in a liquid, such as certain powdered fertilizers or insecticides which are mixed with water to facilitate dispersal.

From the above discussion, it will be clear that the improved spraying device 10 provides a versatile yet inexpensive liquid dispensing device for the home owner or weekend gardner, and is at the same time suitable for various commercial farmer applications. The device 10 allows the operator to easily configure the direction, area of coverage and volume of the spray dispensed from the liquid dispersing means and even provides agitator means to ensure that the liquid dispensed is well mixed such that chemicals can be evenly applied to the lawn or garden.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A mobile spraying device for being drawn by a suitable drawing vehicle driven by an operator for dispersing a liquid over a preselected surface, said device comprising:
   a primary frame provided with at least two rotatably mounted wheel members, said primary frame having a first end provided with means for releasably engaging said drawing vehicle, and a second end;
   a supply tank mounted on said primary frame for holding said liquid;
   a pump mounted on said primary frame for pumping said liquid from said supply tank, said pump defining an inlet port and an outlet port and being provided with means for establishing fluid communication between said inlet port of said pump and said supply tank, and further provided with circuitry means for connecting said pump to a suitable electric power source;
   a secondary frame attached to said primary frame at said second end, said secondary frame comprising a pair of substantially upright side members having lower ends attached to said primary frame and upper ends, a first horizontally disposed support bar joining said upper ends, and a second horizontally disposed support bar joining said side member intermediate said first support bar and said lower ends of said side members, each of said side members and said support bars being provided with fastening means;
   liquid dispersing means for selectively dispersing said liquid pumped from said supply tank by said pump over said preselected surface, said liquid dispersing means comprising at least one sprayer bar carrying a plurality of spray nozzles, said sprayer bar being provided with means for establishing fluid communication between said sprayer bar and said outlet port of said pump; and
   clamp means for cooperation with said fastening means to selectively position and releasably fasten said sprayer bar horizontally or vertically to a selected one of said side members and said support bars for spraying said liquid over said selected surface.

2. The spraying device of claim 1 wherein said liquid dispersing means further comprises a hand held sprayer provided with a sprayer supply hose for establishing fluid communication between said hand held sprayer and said pump, and a support member attached to said primary frame within reach of said operator of said drawing vehicle for releasably supporting said hand held sprayer when said hand held sprayer is not in use.

3. The spraying device of claim 1 wherein said supply tank is provided with a first conduit located proximate the bottom of said supply tank and communicating with the interior of said supply tank, said conduit defining an outboard end portion, and wherein said means for establishing fluid communication between said inlet port of said pump and said supply tank comprises a primary supply hose having first and second end portions, said first end portion of said primary supply hose being secured to said outboard end portion of said first conduit of said tank and said second end portion of said primary supply hose being secured to said inlet port of said pump.

4. The spraying device of claim 1 wherein said supply tank is cylindrical with an axis disposed substantially horizontal, and comprises:

at least one translucent end wall provided with level measuring indicia for allowing visual determination of the amount of said liquid in said supply tank; and wherein said supply tank defines an access aperture provided with a cap for selectively closing said access aperture, said access aperture being of sufficient size to allow the insertion of an arm of said operator to facilitate cleaning of said supply tank.

5. The spraying device of claim 1 wherein each said nozzle of each said sprayer bar comprises a base member and a nozzle body, said base member and said nozzle body defining a conduit through which said liquid is selectively dispersed from said sprayer bar, said nozzle body being rotatably mounted on said base member so as to rotate about a first axis and said nozzle body comprising a first member and a second member, said second member being secured to said first member such that said second member is rotatable with respect to said first member about a second axis substantially perpendicular to said first axis, said second member carrying a nozzle end, said nozzle end being provides with a knurled sleeve for rotatably adjusting the broadness of the spray dispersed from said nozzle.

6. The spraying device of claim 1 wherein said sprayer bar comprises a plurality of tubular sections releasably joined by junction members whereby said sprayer bar is adjustable in length, each of said junction members provided with one of said plurality of spray nozzles, said spary nozzles adapted for adjustment as to broadness and direction of dispersal of said liquid.

7. The spraying device of claim 1 wherein each said sprayer bar is provided with an inlet port and wherein said means for establishing fluid communication between each said sprayer bar and said outlet port of said pump comprises a valve secured to said outlet of said pump, said valve having a plurality of selectable exit ports and a valve manipulator for selectively closing said exit ports by said operator, said means for establishing communication further comprising at least one distribution hose for each said sprayer bar, each said distribution hose having first and second ends, said first end of said distribution hose being secured to one said exit ports of said valve and said second end of said distribution hose being secured to said inlet port of said sprayer bar.

8. The spraying device of claim 7 further comprising an agitator means for mixing contents of said supply tank wherein said agitator means comprises an inverted cup-shaped agitator nozzle mounted within said supply tank proximate the bottom of said supply tank, said agitator nozzle being provided with a plurality of selectively spaced holes opening into the interior of said tank and provided with a conduit extending exterior to said tank, said conduit being in fluid communication with said plurality of holes in said agitator nozzle, said agitator means further comprising means for establishing fluid communication between one of said exit ports of said valve and said conduit of said agitator nozzle whereby fluid can be pumped by said pump to said agitator nozzle and injected into the interior of said tank for mixing said contents of said tank.

9. A spraying device for being drawn by a suitable vehicle driven by an operator for dispersing a liquid vertically or horizontally over a preselected surface, said device comprising:

a primary frame having an undercarriage carrying a pair of rotatably mounted wheels, said primay frame having a first end carrying a coupling member for releasable attachment to said vehicle, and a second end;

a substantially cylindrical liquid supply tank, having an axis, mounted on said primary frame with said axis horizontal; one end of said tank being translucent and provided with liquid-level indicia thereon to visually determine liquid level in said tank, said tank provided with an access aperture of sufficient size such that said liquid can be introduced into said tank and said tank can be cleaned when desired;

a pump attached to said primary frame, said pump having an inlet port communicating with said tank, and an oulet port, said pump provided with circuitry means for connecting said pump to a suitable source of electrical power;

a secondary frame attached to said second end of said primary frame, said secondary frame comprising a pair of upright side members each having a first end attached to said primary frame, and a second end, a first substantially horizontal support bar attached between said second ends of said side members, and a second substantially horizontal support bar attached between said side members intermediate said first support bar and said first ends of said side members, each of said side memebrs and said support bars being provided with fastener means;

at least one sprayer bar for dispersing said liquid, said sprayer bar being fabricated of a plurality of tubular sections releasably joined with junction members whereby said sprayer bar is adjustable in length, each of said junction members provided with a sprayer nozzle adapted for adjustment as to broadness and direction of dispersal of said liquid;

clamp means cooperating with said sprayer bar and said fastener means for releasably clamping said sprayer bar to a selected one of said side members and said support members for selectively clamping said sprayer bar in an upright or a horizontal orientation during said dispersing of said liquid from said nozzles; and valve means operable by said operator, said valve means provided with an inlet port in fluid communication with said outlet port of said pump and a plurality of outlet ports, one of said outlet ports being in fluid communication with said at least one said sprayer bar.

10. The spraying device of claim 9, further comprising:

a hand held sprayer for use by said operator, said hand held sprayer in fluid communication with an outlet port of said valve means;

an upright support member for releasably supporting said hand held sprayer when not in use, said support member being attached to said primary frame at a position within reach of said operator from said drawing vehicle; and an agitator within said tank for mixing contents of said tank, said agitator provided with a mixing head having a plurality of openings communicating between the interior of said tank and a fluid conduit leading to said head, said conduit being in fluid communcation with an outlet port of said valve menas.

11. A spraying device for being drawn by a suitable vehicle driven by an operator for dispersing a liquid vertically or horizontally over a preselected surface, said device comprising:

a primary frame having an undercarriage carrying a pair of rotatably mounted wheels, said primary frame having a first end carrying a coupling member for releasable attachment to said vehicle, and a second end;

a substantially cylindrical liquid supply tank, having an axis, mounted on said primary frame with said axis horizontal, one end of said tank being translucent and provided with liquid-level indicia thereon a visually determined liquid level in said tank, said tank provided with an access aperture of sufficient size such that said liquid can be introduced into said tank and said tank can be cleaned when desired;

an agitator positioned within a lower portion of said tank, said agitator having a cylindrical cap provided with a plurality of openings communicating with an inlet to said agitator;

a pump system attached to said primary frame, said pump having an inlet port communicating with said tank, and an outlet port, said pump provided with circuitry means for connecting said pump to a suitable source of electrical power;

a secondary frame attached to said second end of said primary frame, said secondary frame comprising a pair of upright side members each having a first end attached to said primary frame, and a second end, a first substantially horizontal support bar attached between said second ends of said side members, and a second substantially horizontal support bar attached between said side members intermediate said first support bar and said first ends of said side memebrs, each of said side members and said support bars being provided with fasterner means;

at least one sprayer bar for dispersing said liquid, said sprayer bar having an inlet and being fabricated of a plurality of tubular sections releasably joined with junction members whereby said sprayer bar is adjustable in length, each of said junction members provided with a sprayer nozzle adapted for adjustment as to broadness and direction of dispersal of said liquid;

clamp means cooperating with said sprayer bar and said fastener means for releasably clamping said sprayer bar to a selected one of said side members and said support members for selectively positioning said sprayer bar in an upright or a horizontal orientation during said dispersing of said liquid from said nozzles;

a hand held sprayer for use by said operator, said hand held sprayer having an inlet port;

an upright support member for releasably supporting said hand held sprayer when not in use, said support member being attached to said primary frame at a position within reach of said operator from said drawing vehicle; and valve means operable by said operator, said valve means provided with an inlet port in fluid communication with said outlet port of said port and a sufficient number of outlet ports in fluid communication with said at least one said sprayer bar, said inlet to said agitator, and said inlet to said hand held sprayer, said valve provided with a valve manipulator for selectively closing said outlet ports of said valve by said operator.

* * * * *